(12) United States Patent
Thierry et al.

(10) Patent No.: US 9,593,732 B2
(45) Date of Patent: Mar. 14, 2017

(54) ANTI-VIBRATION DEVICE

(75) Inventors: Pascal Thierry, Villiers sur Loir (FR); Patrick Loriot, Voise (FR); Pascal Petit, Beaugency (FR); Mickael Desmoulins, Villamblain (FR)

(73) Assignee: Hutchinson, Paris (FR)

( * ) Notice: Subject to any disclaimer, the term of this patent is extended or adjusted under 35 U.S.C. 154(b) by 911 days.

(21) Appl. No.: 12/601,162

(22) PCT Filed: May 23, 2008

(86) PCT No.: PCT/FR2008/050901
§ 371 (c)(1),
(2), (4) Date: Jun. 25, 2010

(87) PCT Pub. No.: WO2008/152284
PCT Pub. Date: Dec. 18, 2008

(65) Prior Publication Data
US 2010/0264570 A1  Oct. 21, 2010

(30) Foreign Application Priority Data
May 24, 2007 (FR) ...................... 07 03679

(51) Int. Cl.
*F16F 1/36* (2006.01)
*F16F 13/10* (2006.01)
*F16F 15/08* (2006.01)
*B60K 5/12* (2006.01)

(52) U.S. Cl.
CPC .............. *F16F 1/36* (2013.01); *F16F 13/103* (2013.01); *F16F 15/08* (2013.01); *B60K 5/1208* (2013.01); *F16F 2226/04* (2013.01)

(58) Field of Classification Search
CPC .. F16F 1/36; F16F 13/103; F16F 15/08; F16F 2226/04; F16F 13/08; F16F 13/10; B60K 5/1208
See application file for complete search history.

(56) References Cited

U.S. PATENT DOCUMENTS

| 3,671,065 | A | * | 6/1972 | Bingham ...................... 292/175 |
| 5,127,698 | A |   | 7/1992 | König |
| 5,193,643 | A |   | 3/1993 | McIntyre |
| 5,195,717 | A |   | 3/1993 | Benz |
| 5,582,394 | A |   | 12/1996 | Bitschkus et al. |

(Continued)

FOREIGN PATENT DOCUMENTS

| DE | 1741852 | 2/1957 |
| DE | 30 19 303 A1 | 5/1980 |
| DE | 40 11 827 A1 | 4/1990 |
| DE | 43 22 126 | 1/1995 |
| DE | 10249387 | 2/2004 |
| DE | 102004018241 | 4/2004 |

(Continued)

OTHER PUBLICATIONS

French Preliminary Search Report FR 0703679; report dated Jan. 17, 2008.

*Primary Examiner* — Thomas Irvin
(74) *Attorney, Agent, or Firm* — Miller, Matthias & Hull LLP

(57) ABSTRACT

An anti-vibration device comprising first and second strength members interlinked by an elastomer body adapted to work in compression mode along a main vibration axis is disclosed. The first strength member is fitted in a slider of a support, in a direction of fitting perpendicular to the main vibration axis. The first strength member is blocked in the slider by snap-fitting.

14 Claims, 7 Drawing Sheets

(56) References Cited

U.S. PATENT DOCUMENTS

| | | | |
|---|---|---|---|
| 5,636,826 A | 6/1997 | Nakagaki et al. | |
| 6,296,236 B1* | 10/2001 | Ott | 267/140.11 |
| 6,592,285 B1* | 7/2003 | Schwarz | 403/179 |
| 7,258,331 B2* | 8/2007 | Schneider | 267/140.13 |
| 7,611,288 B2* | 11/2009 | Lew | 384/536 |
| 7,635,116 B2* | 12/2009 | Bellamy et al. | 267/140.13 |
| 2004/0021259 A1* | 2/2004 | Visage et al. | 267/140.13 |
| 2005/0098374 A1 | 5/2005 | Moon | |
| 2005/0151309 A1* | 7/2005 | Schneider | 267/140.12 |
| 2005/0236749 A1* | 10/2005 | Gross et al. | 267/122 |
| 2006/0157633 A1* | 7/2006 | Bellamy et al. | 248/562 |
| 2007/0172167 A1* | 7/2007 | Lew | 384/536 |
| 2007/0178258 A1* | 8/2007 | Petit et al. | 428/34.1 |
| 2008/0067727 A1* | 3/2008 | Schwarz et al. | 267/141.1 |
| 2010/0276853 A1* | 11/2010 | Visage et al. | 267/140.4 |

FOREIGN PATENT DOCUMENTS

| | | | |
|---|---|---|---|
| DE | 10 2004 056 884 A1 | 6/2006 | |
| EP | 0456991 | 11/1991 | |
| EP | 1321692 | 6/2003 | |
| EP | 1628040 | 6/2005 | |
| FR | 2 806 035 | 9/2001 | |
| FR | 2 809 996 | 12/2001 | |
| FR | 2810712 | 12/2001 | |
| JP | 06/264968 A | 9/1994 | |
| JP | 11063057 | 3/1999 | |
| JP | 2001/221286 A | 8/2001 | |
| JP | 2003/269506 A | 9/2003 | |
| WO | WO 02/095259 | 11/2002 | |
| WO | WO 2005/093272 | 10/2005 | |
| WO | WO2005093272 A1 * | 10/2005 | F16C 27/00 |

* cited by examiner

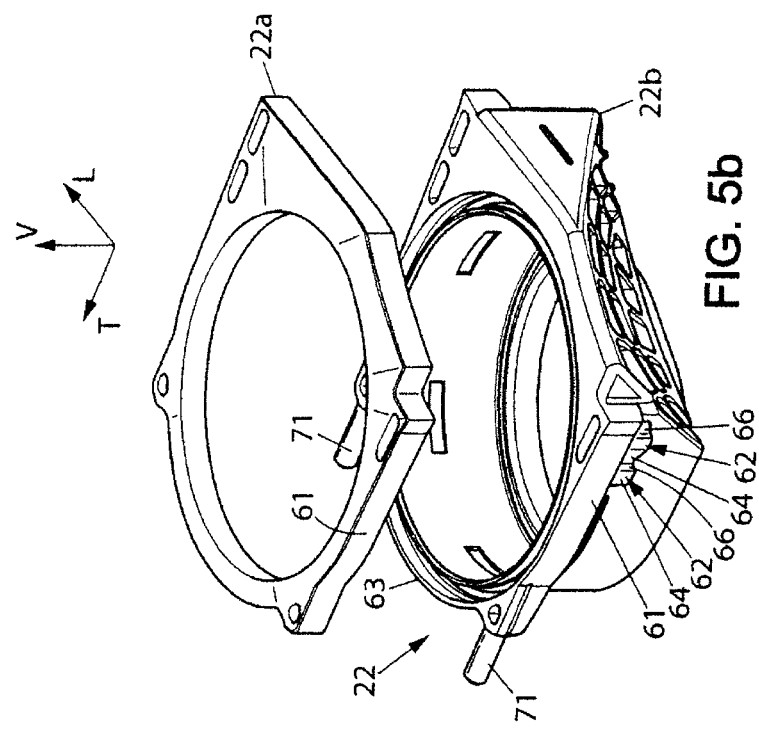
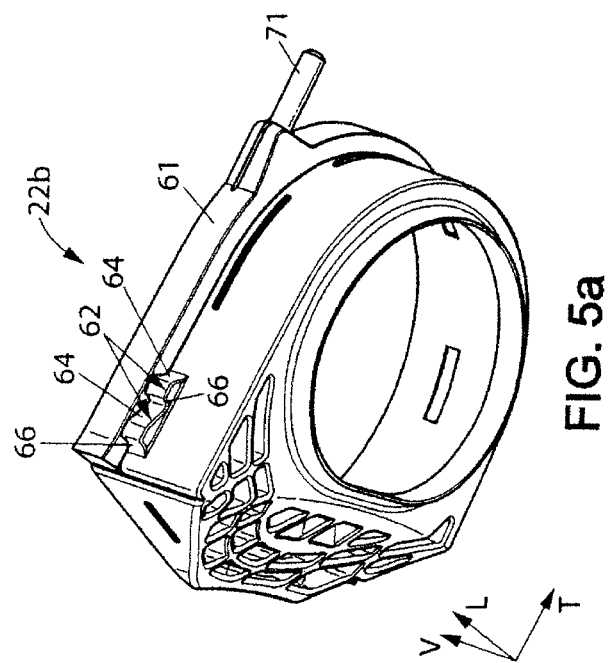

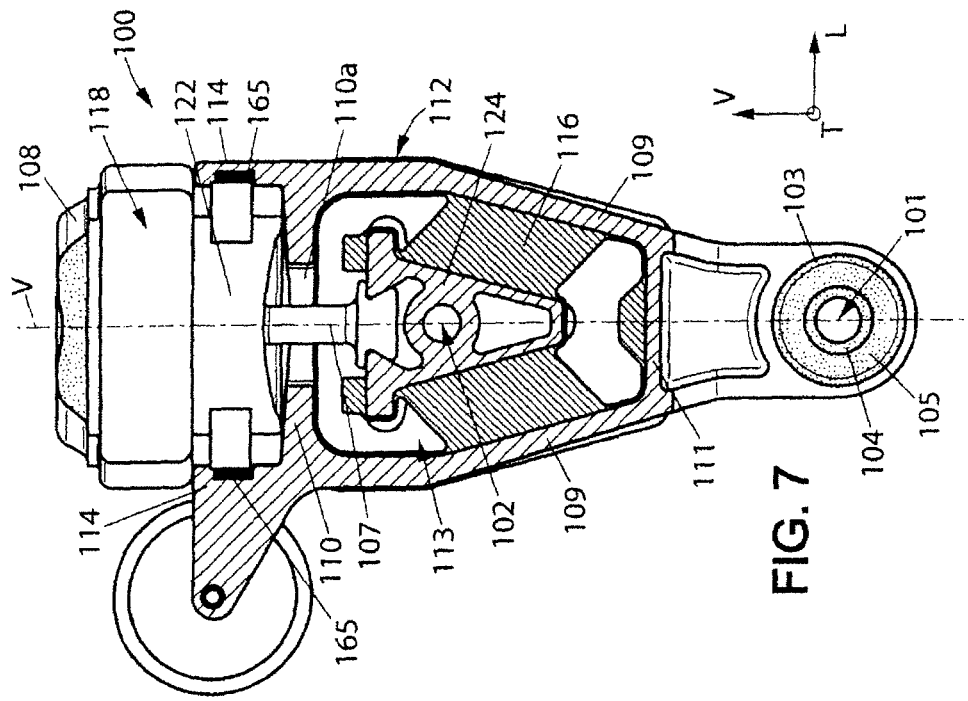
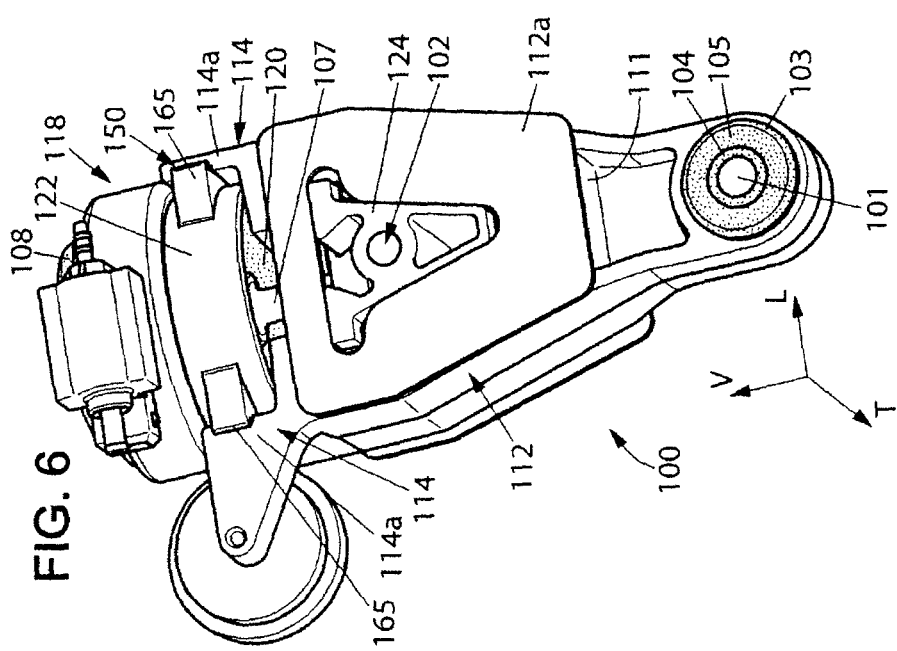

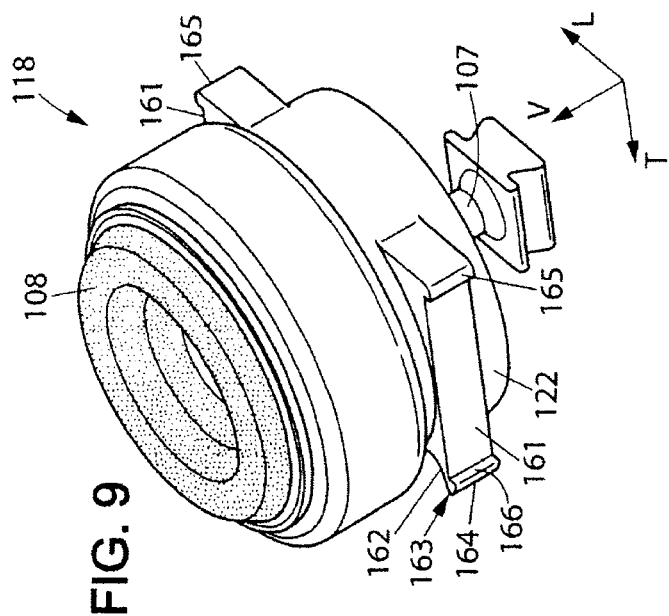
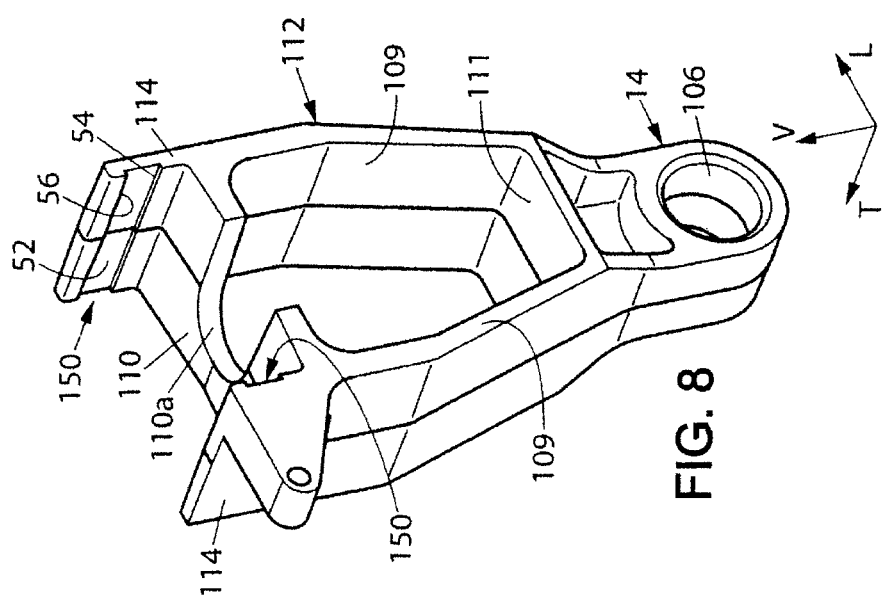

ANTI-VIBRATION DEVICE

CROSS-REFERENCE TO RELATED APPLICATIONS

This application is a U.S. national stage filing of International Patent Application No. PCT/FR2008/050901 filed on May 23, 2008, which claims priority under the Paris Convention to the French Patent Application No. 07 03678, filed on May 24, 2007.

FIELD OF THE DISCLOSURE

The present invention relates to anti-vibration devices.

The invention concerns more particularly an anti-vibration device including:

first and second strength members interconnected by an elastomer body adapted to be deformed at least relative to a main vibration axis, and a support provided with at least one slider formed by two facing parallel open grooves extending in a fitting direction substantially perpendicular to the main vibration axis, the first strength member including two exterior lateral ribs respectively fitting in the two sliders in the fitting direction, in a fitting direction substantially perpendicular to the main vibration axis.

BACKGROUND OF THE DISCLOSURE

The document WO-A-02/095259 discloses an anti-vibration device of this type which is entirely satisfactory as to its functioning but has the drawback of necessitating a punching operation to block the first strength member in the slider, which complicates the fabrication process and makes it more costly.

SUMMARY OF THE DISCLOSURE

One particular object of the present invention is to alleviate this drawback.

To this end, according to the invention, a device of the kind in question is characterized in that the first strength member is blocked in the slider by snap-fitting.

Thus the means for blocking the first strength member in the slider can be integrated into the support and the first strength member during manufacture, which simplifies the method of manufacturing the device of the invention and reduces the cost thereof.

Various embodiments of the invention can optionally have further recourse to one and/or the other of the following features:

the first strength member is abutted against the support in an engagement orientation in the fitting direction and the first strength member is blocked by snap-fitting on the support in a withdrawal orientation opposite the engagement orientation;

the first strength member is blocked in the slider by snap-fitting an elastic member that is part of a first element chosen from the first strength member and the support said elastic member including an anti-withdrawal abutment area that is abutted against an anti-withdrawal bearing area that is part of a second element chosen from the first strength member and the support;

the elastic member is part of the first strength member and the anti-withdrawal bearing area is part of the support;

the elastic member includes opposite the anti-withdrawal abutment area an inclined leading face adapted to deform elastically the elastic member by a cam effect when the first strength member is fitted into said slider;

the elastic lug is a flexible lug extending forwardly in the fitting direction in the engagement orientation;

the first strength member is blocked in the slider in the engagement orientation by snap-fitting in a rear area of the slider;

the first strength member is blocked in the slider by snap-fitting a plurality of elastic members;

the support includes two lateral branches carrying respective sliders, said lateral branches being connected by a bottom and delimiting a mouth through which the first strength member is fitted, the first strength member being blocked in the slider by snap-fitting in the vicinity of the mouth;

the first strength member includes two pins extending in the fitting direction and adapted to engage in complementary holes formed in the support.

Other features and advantages of the invention will become apparent in the course of the following description of a number of embodiments thereof given by way of nonlimiting example with reference to the appended drawings.

BRIEF DESCRIPTION OF THE DRAWINGS

In the drawings:

FIG. 5a is a perspective view from below of part of the first strength member of the anti-vibration device from FIGS. 1 to 3, FIG. 5b is an exploded perspective view from above of two parts constituting the first strength member of the anti-vibration device from FIGS. 1 to 3, FIG. 6 is a perspective view of an anti-vibration device of a second embodiment of the invention, FIG. 7 is a view in longitudinal section of the device from FIG. 6, FIG. 8 is a perspective view of the support of the anti-vibration device from FIGS. 6 and 7, and FIG. 9 is a perspective view of a hydraulic capsule of the anti-vibration device from FIGS. 6 and 7, this hydraulic capsule comprising the first strength member.

DETAILED DESCRIPTION OF THE DISCLOSURE

In the various figures, the same references designate identical or similar elements.

Figure 1:
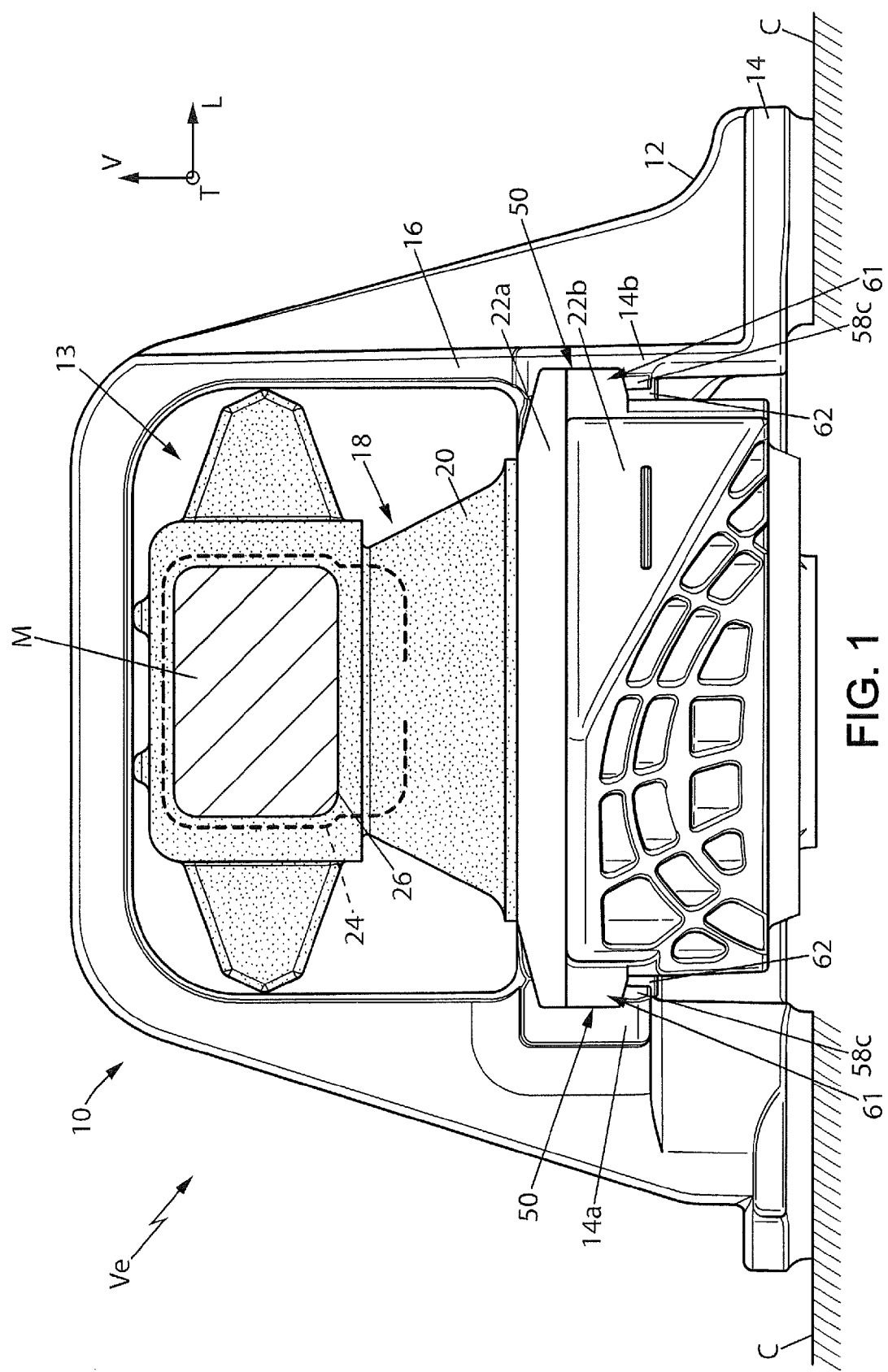
FIG. 1 is a front view of an anti-vibration device of a first embodiment of the invention.

FIG. 1 represents an anti-vibration device 10 of a first embodiment of the invention that is adapted to connect:

on the one hand, a first rigid element, for example the body C of a vehicle Ve, and on the other hand, a second rigid element, for example the engine M of the vehicle Ve.

The anti-vibration device 10 includes a support 12 which can for example be molded in one piece from plastic material or cast in one piece from light alloy and which features:

a horizontal base 14 with fixing points 15 (see FIGS. 2 and 3) for fixing the support 12 to the body of the vehicle (the fixing points 15 can be holes for bolts to pass through, for example), and a delimiter arch 16 that extends substantially vertically from the base 14 (in the plane of the axes V, L) and delimits with said base an interior space 13.

Figure 3:
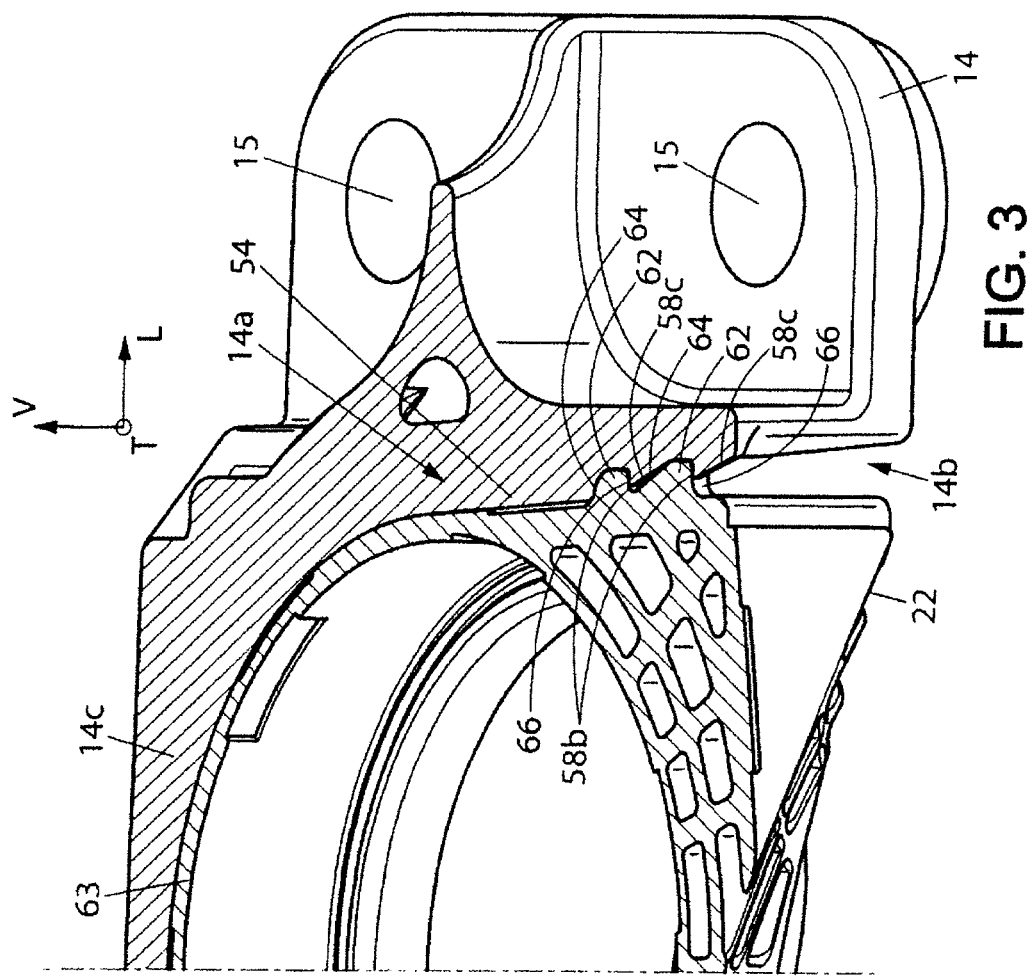
FIG. 3 is a partial perspective view in horizontal section showing the first strength member and the support of the anti-vibration device from FIGS. 1 and 2.
Figure 4:
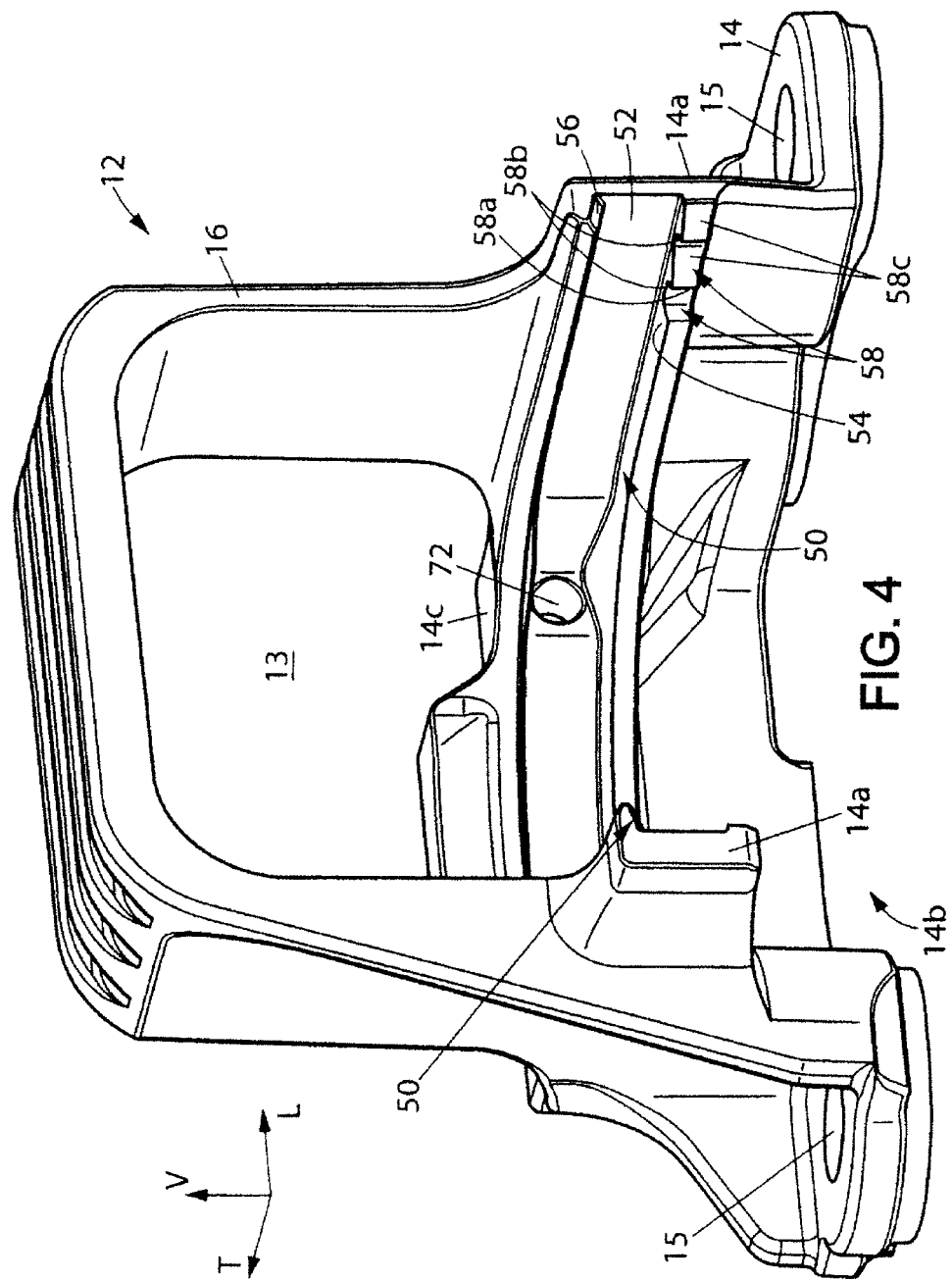
FIG. 4 is a view in perspective of the support of the anti-vibration device from FIGS. 1 to 3.

As can be seen in more detail in FIGS. 3 and 4, the base 14 is generally U-shaped, comprising:

two horizontal lateral branches 14a the free ends of which define an open mouth 14b, and a curved bottom 14c joining said lateral branches at the end opposite the mouth 14b.

In the example considered here, the abovementioned fixing points 15 are provided in walls extending horizontally outward from said lateral branches 14a.

The anti-vibration device further includes an anti-vibration element 18 mounted in the interior space 13 of the support 12, as shown in FIG. 1. The anti-vibration element 18 includes an elastomer body 20 molded over and adhering to first and second strength members 22, 24, which in the example shown are respectively a lower strength member and an upper strength member. The first strength member 22 is fastened to the base 14 of the support 12 and the second strength member 24 is fastened to the engine of the vehicle.

For example, the second strength member 24 can delimit a housing 26 adapted to receive an arm fastened to the engine, which arm can be oriented in a transverse direction T of the vehicle, for example.

The anti-vibration element can in particular be a hydraulic element including an upper working chamber delimited internally by the elastomer body 20 and connected by a constricted passage to a lower compensation chamber, these two chambers being filled with a liquid (these elements are not represented here but are well known in the art).

For mounting the first strength member 22 in the support 12, the base 14 includes two parallel rectilinear sliders 50 (visible in FIGS. 2 and 4 in particular) that in the example represented extend in the direction T, for example. In the example considered here, the sliders 50 are formed by grooves arranged on the inside of the parallel branches 14a of the base.

As shown in FIG. 4, each slider 50 is delimited externally by an external vertical lateral surface 52 that extends between a lower rib 54 and an upper rib 56.

As shown in FIGS. 3 and 4, in the example considered here, the lower rib 54 of each slider 50 includes two notches 58 that open horizontally inward, i.e. toward the first strength member 22.

Each notch is delimited in the direction toward the mouth 14b by a detent 58a which features:

on the one hand, an anti-withdrawal vertical face 58b extending substantially in the plane of the directions L, V and the normal to which is oriented toward the bottom 14c, and on the other hand, an inclined vertical face 58c that extends slantwise toward the interior of the lateral branches 14a and toward the bottom 14c.

Figure 2:
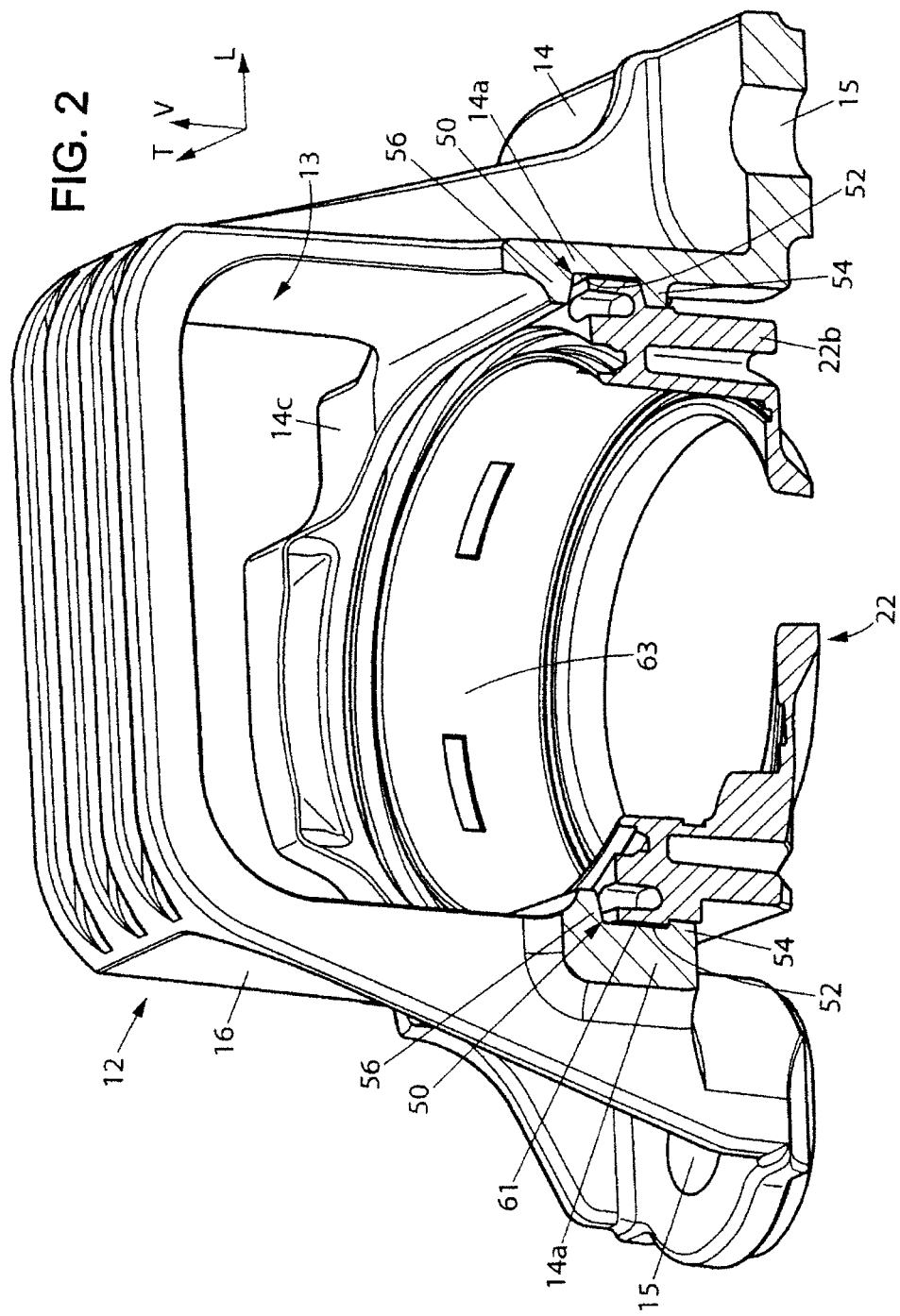
FIG. 2 is a partial perspective view in vertical section showing part of the first strength member and the support of the device from FIG. 1.

As shown in FIGS. 2 and 3, the first strength member 22 has an annular overall shape and includes two rectilinear external lateral ribs 61 parallel to the direction T and sized to fit without play in a respective slider 50, being inserted in said sliders in the direction from the mouth 14b toward the bottom 14c.

As shown in FIG. 5b, the first strength member 22 can where appropriate be formed in two parts 22a, 22b, respectively an upper part and a lower part, each molded in plastic material, for example. These two parts can be assembled by friction or ultrasound welding, for example. The elastomer body 20 is molded onto and adheres to the upper part 22a of the first strength member 22. The aforementioned ribs 61 can be formed partly in the two parts 22a, 22b forming the first strength member.

Under each rib 61 the first strength member 22 includes two anti-withdrawal elastic members, for example two snap-fitting lugs 62 (see FIGS. 3, 5a, 5b) each adapted to engage elastically in a notch 58 of the support 12.

Each snap-fitting lug 62 has a shape similar to the corresponding notch 58, with:

an inclined vertical leading face 64 oriented toward the bottom 14c, i.e. toward the front in the orientation in which the first strength member is inserted into the sliders 50, said inclined face 64 extending slantwise toward the bottom 14c and toward the interior of the lateral branches 14a, and an anti-withdrawal abutment face 66 that is parallel to the axes V, L and is oriented toward the aforementioned mouth 14b.

When the first strength member 22 is engaged in the sliders 50 the snap-fitting lugs 62 are deformed elastically when they pass over the detents 58a delimiting the notches 58 and then said snap-fitting lugs, and engage elastically in the notches 58 when a front portion 63 of the first strength member abuts against the bottom 14c of the base 14. The lateral branches 14a of the support 12 can furthermore open slightly through elastic deformation upon this engagement, thereby facilitating the passage of the lugs 62 over the detents 58a.

Once the lugs 62 have been clipped into the notches 58, the anti-withdrawal abutment faces 66 of said lugs abut against and cooperate with the anti-withdrawal faces 58b of the notches 58a, thus preventing the ribs 61 of the first strength member escaping from the sliders 50 of the support 12.

Furthermore, the strength member 22 can also include two horizontal pins 71 (see FIGS. 4, 5a, 5b) extending in the direction T and adapted to engage in complementary holes 72 formed in corresponding relationship in the bottom 14c of the base, which facilitates correct positioning of the first strength member 22 relative to the support 12.

It will be noted that the number of notches 58 and lugs 62 could be other than 4 and that they could be disposed differently than in the embodiment described above or be replaced by any other snap-fitting means.

In the second embodiment of the invention shown in FIGS. 6 to 9, the anti-vibration device is a stabilizer rod 100 for automobile vehicles that includes a rigid supporting body 112, produced in light alloy, for example, connecting together first and second articulations 101, 102, one of which is adapted to be fixed to the body of the vehicle and the other of which is adapted to be fixed to the engine of the vehicle.

As represented in FIG. 7, the first articulation 101 can for example include two rigid rings 103, 104 that are concentric and linked together by an elastomer ring 105, the external rigid ring 103 being fitted into a cylindrical housing 106 of the body 112.

For its part, the second articulation 102 includes a rigid metal strength member 124 that is disposed with clearance in an internal recess 113 of the body 112 and is connected to said body 112 by a flexible elastomer member 116. In the example represented, the flexible elastomer member 116 has an inverted V-shape and is disposed symmetrically relative to the longitudinal direction V of the rod 100, which is also the main direction of the vibrations to which said rod is subjected (here the direction V is no longer a vertical direction as in the first embodiment of the invention).

Also, the rod 100 includes a hydraulic capsule 118 including a rigid annular strength member 122 fastened to the body 112 of the rod and delimiting internally:
- a working chamber delimited axially toward the strength member 124 by an elastomer body 120 (FIG. 6) fastened to a rigid metal rod 107 itself fastened to the aforementioned strength member 124, and
- a compensation chamber delimited axially on the side opposite the elastomer body 120 by a flexible elastomer wall 108 (FIGS. 6 and 7), said compensation chamber being connected to the working chamber by a constricted passage. The working and compensation chambers and the constricted passage are not visible in the drawings but are well known in the art.

As represented in FIG. 7, the body 112 of the rod can be open in a transverse direction T perpendicular to the direction V and said body 112 of the rod limits movement of the strength member 124 in the aforementioned direction V and in a direction L perpendicular to the directions V and T. The movement of the strength member 124 can be limited by, for example:
- two lateral walls 109 of said body 112 that delimit the recess 113 in the direction L,
- an end wall 110 of the body 112 that delimits the recess in the direction V away from the first articulation 101, this end wall having a U-shape cutout 110a open in the direction T to enable the rod 107 to pass through it, and
- an end wall 111 of the body 112 that delimits the recess in the direction V toward the first articulation 101.

The open faces of the body 112 of the rod can where appropriate be protected by plates 112a visible in FIG. 6.

At its end opposite the first articulation 101, the body 112 of the rod has two parallel wings 114 extending in the directions V, T. As shown in FIG. 8, the wings 114 include respective sliders 150 parallel to the direction T formed by two facing open grooves.

For its part the strength member 122 of the hydraulic capsule includes two ribs 161 (see FIG. 9) parallel to the direction T that project away from each other and fit without clearance in the sliders 150, sliding in the direction T. Each of these ribs 161 includes:
- at its front end as defined by the direction of insertion into the clips, an elastic clipping lug 162 that projects in the direction T, and
- at its rear end as defined by the direction of insertion into the sliders, an abutment 165 that projects laterally outward and abuts against the corresponding wing 114 when the strength member 122 is inserted all the way into the slider.

Each snap-fitting elastic lug includes on the outside a notch 163 oriented toward the corresponding wing 114. The notch 163 includes an inclined leading face 164, which extends slantwise outward and rearward so that it can flex the lug 162 elastically by virtue of a cam effect when fitting the strength member 122 into the sliders 150, and an anti-withdrawal abutment face 166. The anti-withdrawal abutment face 166 of each elastic lug 162 is engaged elastically against the end 114a of the corresponding wing 114 when the strength member 122 is inserted all the way into the sliders 150 (see FIG. 6).

The invention claimed is:

1. An anti-vibration device including:
first and second strength members interconnected by an elastomer body adapted to be deformed at least relative to a main vibration axis, the first strength member being annular with its axis parallel to the main vibration axis; and
a support provided with at least one slider formed by two facing parallel open grooves extending in a fitting direction substantially perpendicular to the main vibration axis, the first strength member including two exterior lateral ribs respectively fitting in the two grooves in the fitting direction, wherein the first strength member is made of plastic material and is blocked in the slider by a snap-fitting arrangement, and wherein the snap-fitting arrangement comprises a first shape formed in the first strength member and a counterpart shape formed in the support.

2. The anti-vibration device according to claim 1, wherein:
the first strength member is abutted against the support in an engagement orientation in the fitting direction; and
the first strength member is blocked by snap-fitting on the support in a withdrawal orientation opposite the engagement direction.

3. The anti-vibration device according to claim 1, wherein the first shape of the snap-fitting arrangement is formed by an elastic member, said elastic member including an anti-withdrawal abutment area that is abutted against an anti-withdrawal bearing area that is part the counterpart shape of the snap-fitting arrangement.

4. The anti-vibration device according to claim 3, wherein the elastic member includes opposite the anti-withdrawal abutment area an inclined leading face adapted to deform elastically the elastic member by a cam effect when the first strength member is fitted into said slider.

5. The anti-vibration device according to claim 4, wherein the elastic member is a flexible lug extending forwardly in the fitting direction in the engagement orientation.

6. The anti-vibration device according to claim 1, wherein the first strength member is blocked in the slider in the engagement orientation by snap-fitting in a rear area of the slider.

7. The anti-vibration device according to claim 1, wherein the first strength member is blocked in the slider by snap-fitting a plurality of elastic members.

8. The anti-vibration device according to claim 1, wherein the support includes two lateral branches carrying respective grooves, said lateral branches being connected by a bottom and delimiting a mouth through which the first strength member is fitted, the first strength member being blocked in the slider by snap-fitting in the vicinity of the mouth.

9. The anti-vibration device according to claim 1, wherein the first strength member includes two pins extending in the fitting direction and adapted to engage in complementary holes formed in the support.

10. The anti-vibration device according to claim 1, wherein the first strength member is blocked in the slider in the engagement orientation by snap-fitting in a rear area of an engagement movement.

11. Vehicle having a body, an engine and an antivibratory device connecting the engine to the body, said antivibratory device comprising:
first and second strength members interconnected by an elastomer body adapted to be deformed at least relative to a main vibration axis, the first strength member being annular with its axis parallel to the main vibration axis, the second strength member being fixed to the engine; and
a support provided with at least one slider formed by two facing parallel open grooves extending in a fitting direction substantially perpendicular to the main vibration axis, the first strength member including two exterior lateral ribs respectively fitting in the two grooves in the fitting direction, the support being fixed to the vehicle body, wherein the first strength member is made of plastic material, and wherein the first strength member is blocked in the slider by a snap-fitting arrangement.

12. Vehicle having a body, an engine and an antivibratory device connecting the engine to the body, said antivibratory device comprising:

first and second strength members interconnected by an elastomer body adapted to be deformed at least relative to a main vibration axis, the first strength member being annular with its axis parallel to the main vibration axis, the second strength member being fixed to the engine; and a support provided with at least one slider formed by two facing parallel open grooves extending in a fitting direction substantially perpendicular to the main vibration axis, the first strength member including two exterior lateral ribs respectively fitting in the two grooves in the fitting direction, the support being fixed to the vehicle body, wherein the first strength member is made of plastic material, wherein the first strength member is blocked in the slider by a snap-fitting arrangement, and wherein the support has:

two horizontal lateral branches which include respectively said grooves and which define an open mouth, a bottom joining said horizontal lateral branches, and wherein said first strength member is inserted in the slider through said open mouth and blocked in the slider by a snap-fitting arrangement close to the open mouth.

13. Vehicle having a body, an engine and an antivibratory device connecting the engine to the body, said antivibratory device comprising:

first and second strength members interconnected by an elastomer body adapted to be deformed at least relative to a main vibration axis, the first strength member being annular with its axis parallel to the main vibration axis, the second strength member being fixed to the engine; and a support provided with at least one slider formed by two facing parallel open grooves extending in a fitting direction substantially perpendicular to the main vibration axis, the first strength member including two exterior lateral ribs respectively fitting in the two grooves in the fitting direction, the support being fixed to the vehicle body, wherein the first strength member is made of plastic material, wherein the first strength member is blocked in the slider by a snap-fitting arrangement, said first strength member being formed in two parts, respectively a lower part and an upper part, wherein the first strength member is blocked in the slider in the engagement orientation by snap-fitting in a rear area of the engagement movement, and the first strength member is blocked in the slider in the engagement orientation by snap-fitting in a rear area of the slider, wherein the first strength member is blocked in the slider by snap-fitting an elastic member that is part of a first element chosen from the first strength member and the support, said elastic member including an anti-withdrawal abutment area that is abutted against an anti-withdrawal bearing area that is part of a second element chosen from the first strength member and the support, and wherein the elastic member belongs to the first strength member and the anti-withdrawal abutment area belongs to the support.

14. Vehicle having a body, an engine and an antivibratory device connecting the engine to the body, said antivibratory device comprising:

first and second strength members interconnected by an elastomer body adapted to be deformed at least relative to a main vibration axis, the first strength member being annular with its axis parallel to the main vibration axis, the second strength member being fixed to the engine; and a support provided with at least one slider formed by two facing parallel open grooves extending in a fitting direction substantially perpendicular to the main vibration axis, the first strength member including two exterior lateral ribs respectively fitting in the two grooves in the fitting direction, the support being fixed to the vehicle body;

wherein the first strength member is made of plastic material, wherein the first strength member is blocked in the slider by a snap-fitting arrangement, said first strength member being formed in two parts, respectively a lower part and an upper part, wherein the first strength member is blocked in the slider in the engagement orientation by snap-fitting in a rear area of the engagement movement, and the first strength member is blocked in the slider in the engagement orientation by snap-fitting in a rear area of the slider, wherein the first strength member is blocked in the slider by snap-fitting an elastic member that is part of a first element chosen from the first strength member and the support, said elastic member including an anti-withdrawal abutment area that is abutted against an anti-withdrawal bearing area that is part of a second element chosen from the first strength member and the support, wherein the elastic member belongs to the first strength member and the anti-withdrawal abutment area belongs to the support, and wherein the support has:

two horizontal lateral branches which include respectively said grooves and which define an open mouth, a bottom joining said horizontal lateral branches, and wherein said first strength member is inserted in the slider through said open mouth and blocked in the slider by a snap-fitting arrangement close to the open mouth.

* * * * *